(12) United States Patent
Chang et al.

(10) Patent No.: US 11,102,196 B2
(45) Date of Patent: Aug. 24, 2021

(54) AUTHENTICATING API SERVICE INVOCATIONS

(71) Applicant: INTERNATIONAL BUSINESS MACHINES CORPORATION, Armonk, NY (US)

(72) Inventors: Rong Chang, Pleasantville, NY (US); Maoyuan Qu, Markham (CA); Yew-Huey Liu, Yorktown Heights, NY (US); Jim Laredo, Katonah, NY (US); Robert Calhoun, Lockbourne, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 16/377,194

(22) Filed: Apr. 6, 2019

(65) Prior Publication Data

US 2020/0322324 A1    Oct. 8, 2020

(51) Int. Cl.
*G06F 21/00* (2013.01)
*H04L 29/06* (2006.01)
(Continued)

(52) U.S. Cl.
CPC .............. *H04L 63/083* (2013.01); *G06F 9/54* (2013.01); *G06F 21/31* (2013.01); *H04L 61/1523* (2013.01)

(58) Field of Classification Search
CPC ......... H04L 9/085; H04L 63/00; H04L 63/06; H04L 9/0819; H04L 9/0822;
(Continued)

(56) References Cited

U.S. PATENT DOCUMENTS 9,292,673 B2    3/2016  Rutkowski et al.
9,721,117 B2 *  8/2017  Pleau .................. H04L 63/0884
(Continued)

FOREIGN PATENT DOCUMENTS

WO    2015/200474 A1    12/2015

OTHER PUBLICATIONS

Mell, P. et al., "Recommendations of the National Institute of Standards and Technology"; NIST Special Publication 800-145 (2011); 7 pgs.

*Primary Examiner* — Ghazal B Shehni
(74) *Attorney, Agent, or Firm* — Intelletek Law Group, PLLC; Gabriel Daniel, Esq.

(57) ABSTRACT

A computer-implemented method and system for authenticating API is provided. An API invocation request associated with a user is received. An API operation and the shareable API key includes validating API key credentials of the shareable API key associated with the API invocation request. There is an additional validation of user credentials of the user associated with the API invocation request. It is determined whether the user having the validated user credentials is authorized to use the shareable API key to invoke the API operation. The API operation is executed in response to determining the user having validated user credentials is authorized to use the shareable API key to invoke the API operation. The authentication integrates validation of the user and the shareable API key, and determines whether a user is a subscriber of a multi-tenant subscription service.

20 Claims, 9 Drawing Sheets

(51) Int. Cl.
*G06F 21/31* (2013.01)
*H04L 29/12* (2006.01)
*G06F 9/54* (2006.01)

(58) Field of Classification Search
CPC ............... H04L 67/1097; H04L 9/0897; H04L 2209/127; H04L 61/1523; H04L 63/083; G06F 21/31; G06F 9/54
See application file for complete search history.

(56) References Cited

U.S. PATENT DOCUMENTS

| | | |
|---|---|---|
| 9,742,918 B2 | 8/2017 | Smith et al. |
| 10,027,716 B2 | 7/2018 | Watson et al. |
| 2010/0250608 A1 | 9/2010 | Malviya et al. |
| 2014/0280492 A1 | 9/2014 | Yang et al. |
| 2016/0344543 A1* | 11/2016 | Alness ................ G06Q 20/065 |
| 2019/0087432 A1* | 3/2019 | Sion .................... H04L 63/0428 |
| 2019/0332691 A1* | 10/2019 | Beadles ................ G06F 16/27 |

* cited by examiner

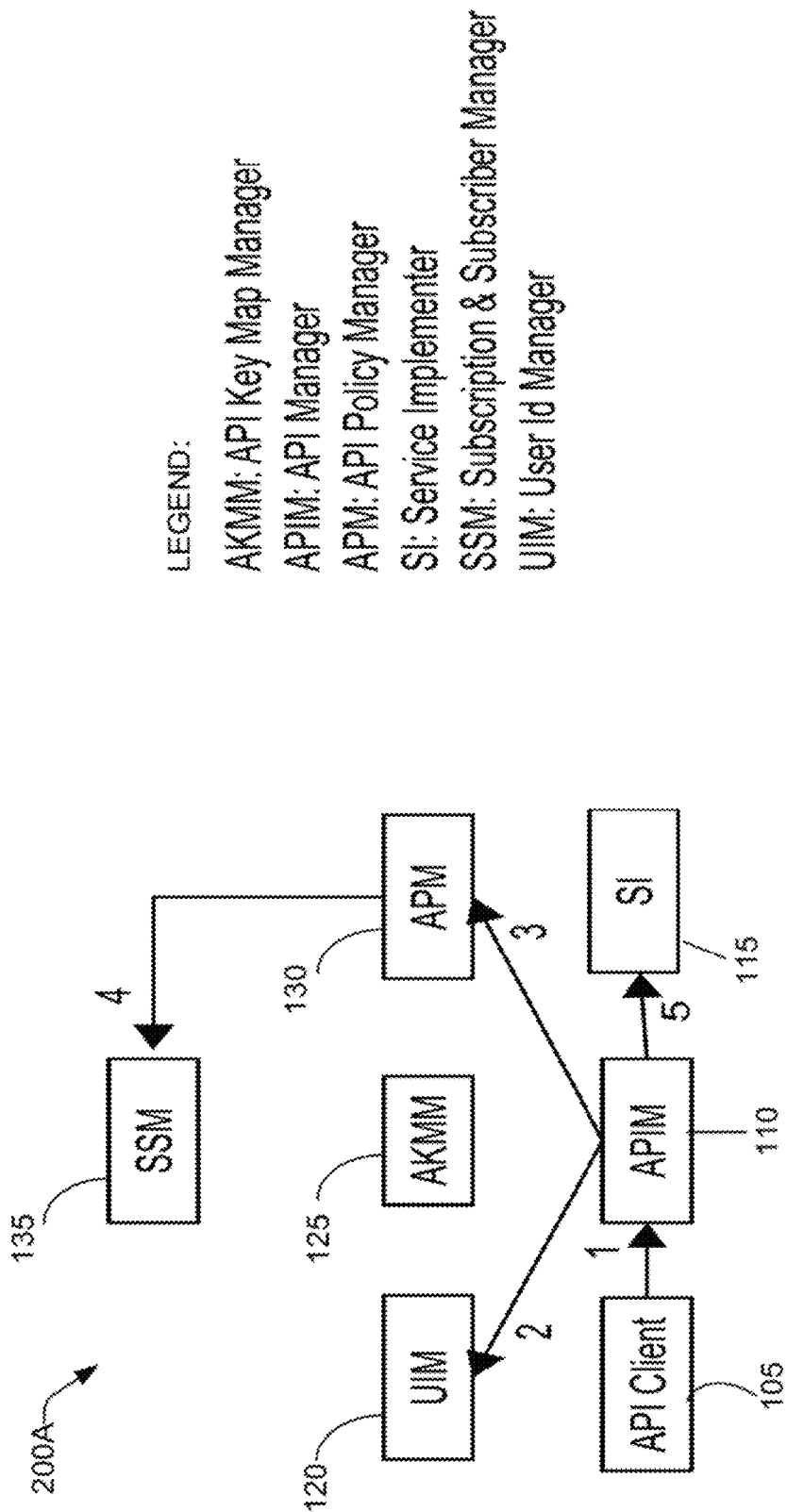

AUTHENTICATING API SERVICE INVOCATIONS

BACKGROUND

Technical Field

The present disclosure generally relates to Application Programming Interface (API) management, and more particularly to service invocations for authentication and authorization in a shared computing environment.

Description of the Related Art

In a shared computing environment where multi-tenant services are provided to various entities such as, for example, service consumers, enterprise organizations, social media platforms, mobile applications and desktop applications, the use of API service invocations in conjunction with the use of shareable API keys are used to perform authentication and authorization of users and their subscriptions.

SUMMARY

According to an embodiment of the present disclosure, a computer-implemented method for authenticating Application Programming Interface (API) service invocations includes a non-transitory computer readable storage medium tangibly embodying a computer readable program code having computer readable instructions that, when executed, cause a computer device to execute a method of validating the use of a shareable API key to invoke an API operation. The computer-implemented method includes the operations of receiving an API invocation request associated with a user, an API operation and the shareable API key. In another operation, the API key credentials of the shareable API key associated with the API invocation request are validated. In still another operation, the user credentials of the user associated with the API invocation request are validated. It is then determined whether the user having validated user credentials is authorized to use the shareable API key to invoke the API operation. The API operation is executed in response to determining that the user having the validated user credentials is authorized to use the shareable API key to invoke the API operation.

In one embodiment, the determining whether the user having validated user credentials is authorized to use the shareable API key includes determining whether the user is an authorized subscriber of a subscription service.

In one embodiment, an API Manager (APIM) receives the API invocation request from an API client, and performs the validating of the API key credentials by validating an API key ID and an API secret key.

In one embodiment, the determining whether the user having validated user credentials is authorized to use the shareable API key to invoke the API operation includes receiving, by an API Policy Manager (APM), the validated API key id, API secret key and a user ID of the user, and validating by a Subscription and Subscriber Manager (SSM), that the user is a subscriber of a subscription that owns the shareable API key.

According to an embodiment of the present disclosure, a computer-implemented method in which a non-transitory computer readable storage medium tangibly embodying a computer readable program code having computer readable instructions that, when executed, cause a computer device to carry out a subscription provisioning process. The computer-implemented method includes adding, by a Subscription and Subscriber Manager (SSM), a user to a subscription after validating a requesting user's credentials via a User ID Manager. In response to receiving an API key provisioning request, the SSM adds to a target subscription a new API key received from an API Key Map Manager (AKMM) after the AKMM receives the new API key provisioned by an API Manager (APIM). The adding to the target subscription is performed in the context based on the SSM's request to enable managing one-to-many relations between subscriptions and a plurality of shareable API keys.

According to an embodiment of the present disclosure, a system for authenticating Application Program Interface (API) Service Invocations includes an API Manager (APIM) configured to receive an API invocation request associated with a user, an API operation and the shareable API key. The APIM is configured to validate API key credentials of the shareable API key associated with the API invocation request. A User ID Manager (UIM) is configured to validate user credentials of the user associated with the API invocation request. An API Policy Manager (APM) is configured to determine whether the user having validated user credentials is authorized to use the shareable API key to invoke the API operation. A Service Implementer (SI) is configured to execute the API operation in response to determining the user having validated user credentials is authorized to use the shareable API key to invoke the API operation.

In one embodiment, the APM determines whether the user having the validated user credentials is authorized to use the shareable API key to invoke the API operation by requesting a Subscription and Subscriber Manager (SSM) to validate that the user is a subscriber of a subscription that owns the shareable API key.

In one embodiment, the APIM is configured to validate the API key credentials by validating an API key ID and an API secret key.

The techniques described herein may be implemented in various ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 2A is a view of some of the components used to perform an API authentication process according to an embodiment of the present disclosure.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at relatively high-level, without detail, in order to avoid unnecessarily obscuring aspects of the present teachings.

Figure 1:
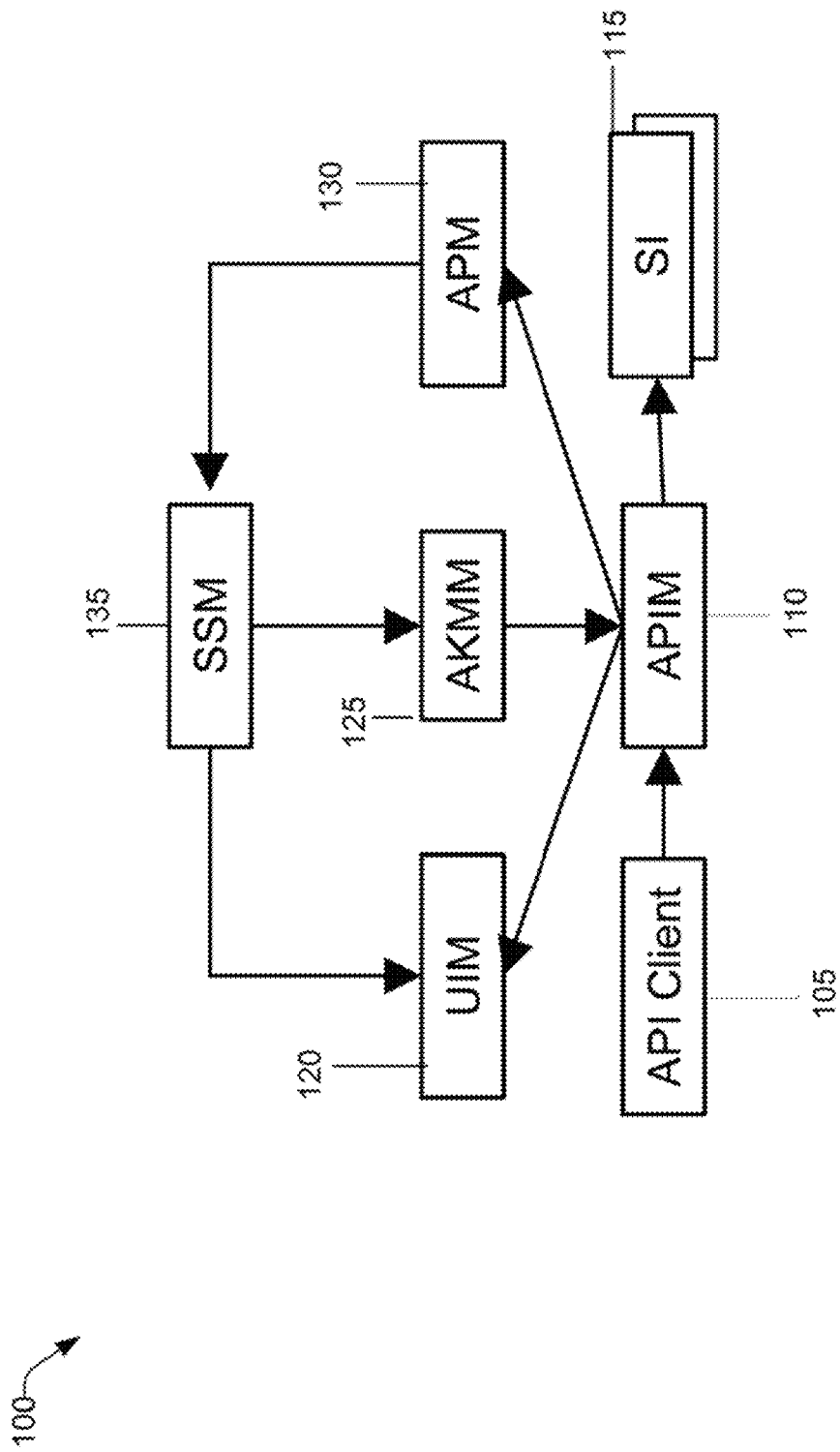
FIG. 1 is an overview of the components for authenticating API service invocations, consistent with an illustrating embodiment.

FIG. 1 is an overview of some of the components that may interact in an API Invocation process according to an embodiment of the present disclosure. It is to be understood that in the embodiments shown herein, such as the API client 105, may be an application, and the components of an API interface may be a second application that authenticates the API client 105. Arrows are used to identify the interaction between various components.

The API Manager (APIM) 110 is configured for communications and control of various modules shown in FIG. 1. The modules may include one or more of software, firmware, and hardware (the hardware may include a microprocessor, microcontroller, etc., that is loaded with executable code). While the modules are shown in logically separate boxes to facilitate understanding by an artisan, the inventive concept is not limited to the arrangement shown in FIG. 1. The APIM 110 manages the lifecycle of API key IDs and secrets keys (create, read, regenerate, revoke) with support for API key validation. The APIM 110 also validates individual API invocation credentials (e.g., those for API key ID and subscription ID), and provides the validated subscriber ID, API key ID, and subscription ID to backend service implementers.

The APIM 110 receives API invocation requests from the API client 105. The API client 105 may include a user, an API operation and the shareable API key. In an example, one application may be the client seeking to automatically update or post information in another application through the use of an API operation and the shareable API key. The APIM 110 is configured to validate the API key credentials by itself.

The User ID Manager (UIM) 120 is configured to manage user IDs and credentials (e.g., password, private keys, etc.) and provide user authentication service for the subscribers.

The API Key Map Manager (AKMM) 125 is configured to enable subscription-based sharing of API keys among multiple users. In addition, the AKMM 125 is configured to enable subscriber-role based management of API keys.

The API Policy Manager (APM) 130 performs a subscription-based integrated validation of subscriber and API key credentials.

The Subscription & Subscriber Manager (SSM) 135 is configured to manage service subscriptions and their respective subscribers (admins and/or users) and shareable API keys.

In addition, when the APIM 110 receives the API operation invocation request from the API client 105, the APIM 110 requests the User ID Manager (UIM) 120 to validate the user credentials. The APIM 110 then sends the validated User ID (validated by the UIM 120) and the validated API key ID (validated by the APIM 110 itself) to the API Policy Manager (APM) 130.

With continued reference to FIG. 1, the APM 130 validates, via communication with the Subscription and Subscriber Manager (SSM) 135, that the user is a subscriber of the subscription that owns the API key. The APM 130 communicates the validation that the user is a subscriber of the subscription that owns the API key to the APIM 110. The APIM 110 instructs the Service Implementer (SI) 115 to execute the requested API operation.

Computer-Implemented Method and System

The present disclosure may be a system, a method, and/or a computer program product at any possible technical detail level of integration. The computer program product may include a computer-readable storage medium (or media) having computer readable program instructions thereon for causing a processor to carry out aspects of the present disclosure. The computer-readable storage medium can be a tangible device that can retain and store instructions for use by an instruction execution device.

The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the presently claimed invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Example API Authentication Process

FIG. 2A is a view of some of the components used to perform an API authentication process in a computer-implemented method and system to an embodiment of the present disclosure. The arrows are numbered to facilitate understanding but it will be understood that the appended claims are not limited to the examples shown and described herein. For example, some of the components can be combined, and are shown separately to facilitate understanding by the artisan.

With reference to FIG. 2A, an API operation invocation request from the API Client 105 is received by the API Manager (APIM) 110. The operation invocation request includes key credentials of a shareable key and user credentials. The APIM 110 validates the key credentials and the UIM 120 is requested to validate the user credentials. The APIM 110 provides the APM 130 with the validated user credentials from the UIM 120 and the user ID having validated user credentials. The APM 130 requests the SSM 135 to validate that the user is a subscriber of the subscription that owns the API key. The APM 130 notifies the APIM 110 that the user's status is a subscriber of the subscription that owns the API key. Upon receiving the information that the user's status is a subscriber, the APIM 110 forwards the requested API operation from the API client 105 to the SI 115 for execution. The SI 115 executes the requested API operation. A subscription-based integrated validation of the subscriber and the API key credentials is performed.

Moreover, an artisan should understand that the components shown in FIG. 1, typically with the exception of the API client 105, may be the components of a server according to a system of the present inventive concept. The server may be, for example, a server in a shared computing environment (e.g. a public/private/hybrid cloud) for, among other types of service consumers, enterprise organizations in which service consumption cost is paid for by organization-level accounts, while service capabilities/resources can be shareable among organization members per project management needs. A collection of multi-tenant API services (e.g., RESTful cloud services) may be running atop the shared computing environment. Other types of multi-tenant API service may be running atop the shared computing environment.

Figure 2B:
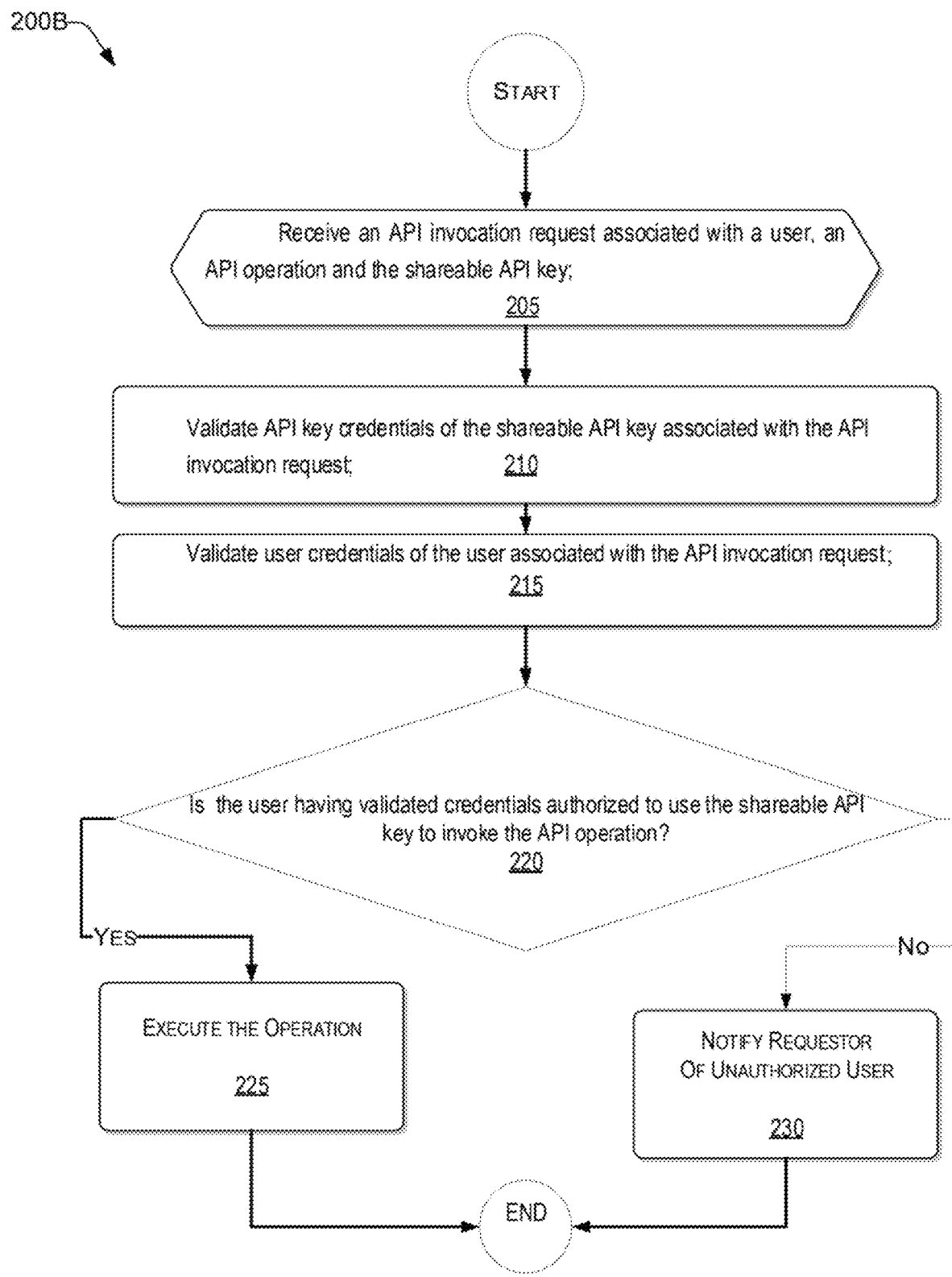
FIG. 2B is a flowchart illustrating an example of a computer-implemented method and system of API authentication according to an embodiment of the present disclosure.

FIG. 2B is a flowchart illustrating an example of a computer-implemented method and system of API authentication according to an embodiment of the present disclosure. It is to be understood by an artisan that the order of the operations is not limited to the illustration shown in FIG. 2B.

At operation 205, an API operation invocation request is received. In an embodiment, the APIM 110 receives the operation invocation request from an API client 105. The API client 105 can be associated with a user, an API operation, and a shareable API key. As previously discussed herein above, the API client may be an application that may be running on top of another application. In a non-limiting example, a collection of multitenant AP services (e.g. Restful Cloud Services) may be running atop of a shared computing environment (e.g. a public/private/hybrid cloud) for, among other types of service consumers, enterprise organizations in which service consumption cost is paid for by organization-level accounts, while service capabilities/resources are shareable among organization members per project management needs. The receipt of an API invocation request received prior to any additional operations shown in FIG. 2B.

Under the service subscription model, an API service deployed in the environment is able to support many projects (as "subscriptions"), each of which can include a plurality of project members as "subscribers". Moreover, every qualified subscriber could be authenticated via her/his service-independent credentials to discover subscription-owned API service invocation keys and, when they remain active for the subscription, authorize the use of the shared API keys. Thus, a two principal approach integrates validation of the user credentials and the shareable key.

At operation 210, the API key credentials of the shareable key associated with API invocation requested are validated. The API key credentials may include the API key ID of the shareable key and an API secret key. With reference to FIG. 2A, the APIM 110 may perform the validations.

At operation 215 the user credentials of the user associated with the API invocation requested is validated. The UIM 120 may perform the validation of the user credentials.

At operation 220, it is determined whether the user having validated credentials is also authorized to use the shareable API key to invoke the API operation. One way this may occur is by the API Policy Manager (APM) 130 requesting the Subscription and Subscriber Manager (SSM) 135 to validate that the user is a subscriber of the subscription that owns the API key.

At operation 225, upon receiving information that the SSM 135 validates the user as being a subscriber of the shareable API key, the Service Implementer (SI) 115 executes the operation. However, if it is determined at operation 220 that the validated user is not a subscriber of the shareable API key, at operation 230 the requestor of the API invocation request is notified that the user is unauthorized.

Example Subscription Provisioning Process

Figure 3A:
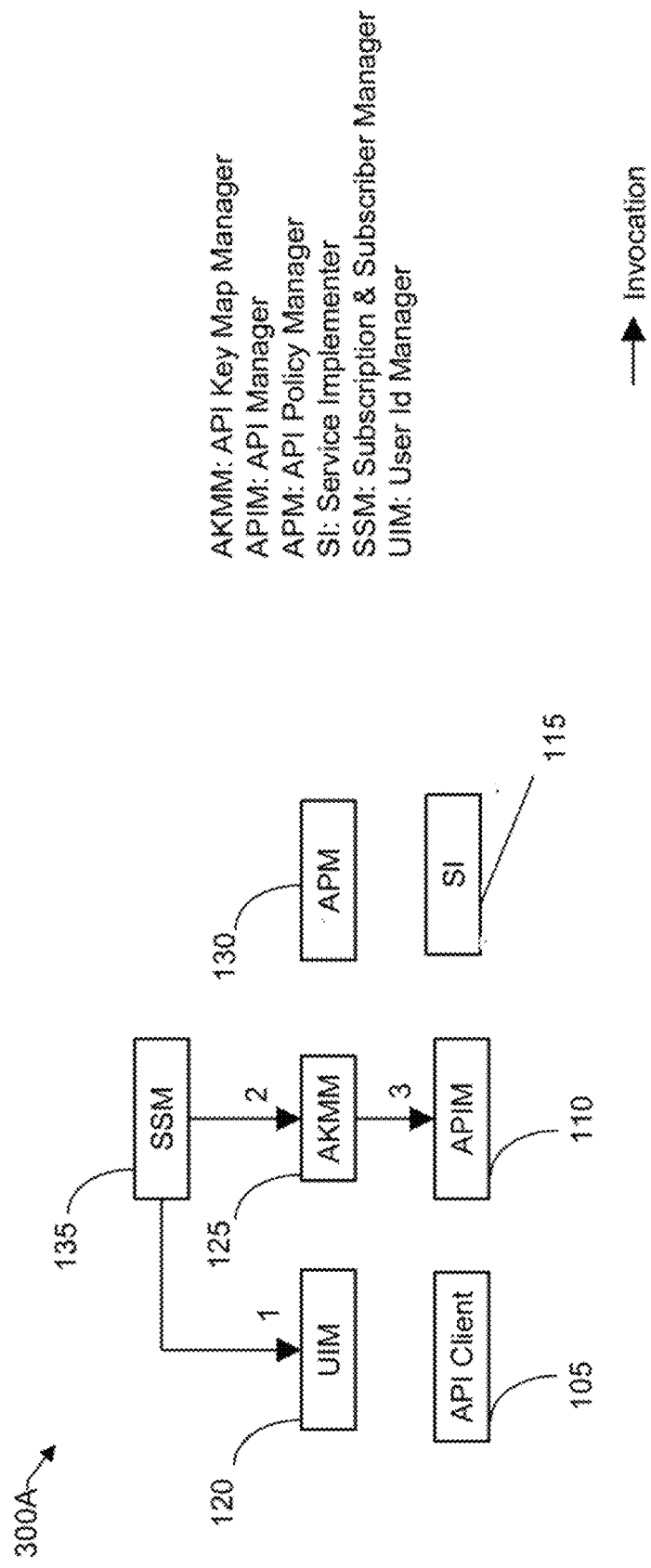
FIG. 3A is an overview of some components used to perform a subscription provisioning process according to an embodiment of the present disclosure.
Figure 3B:
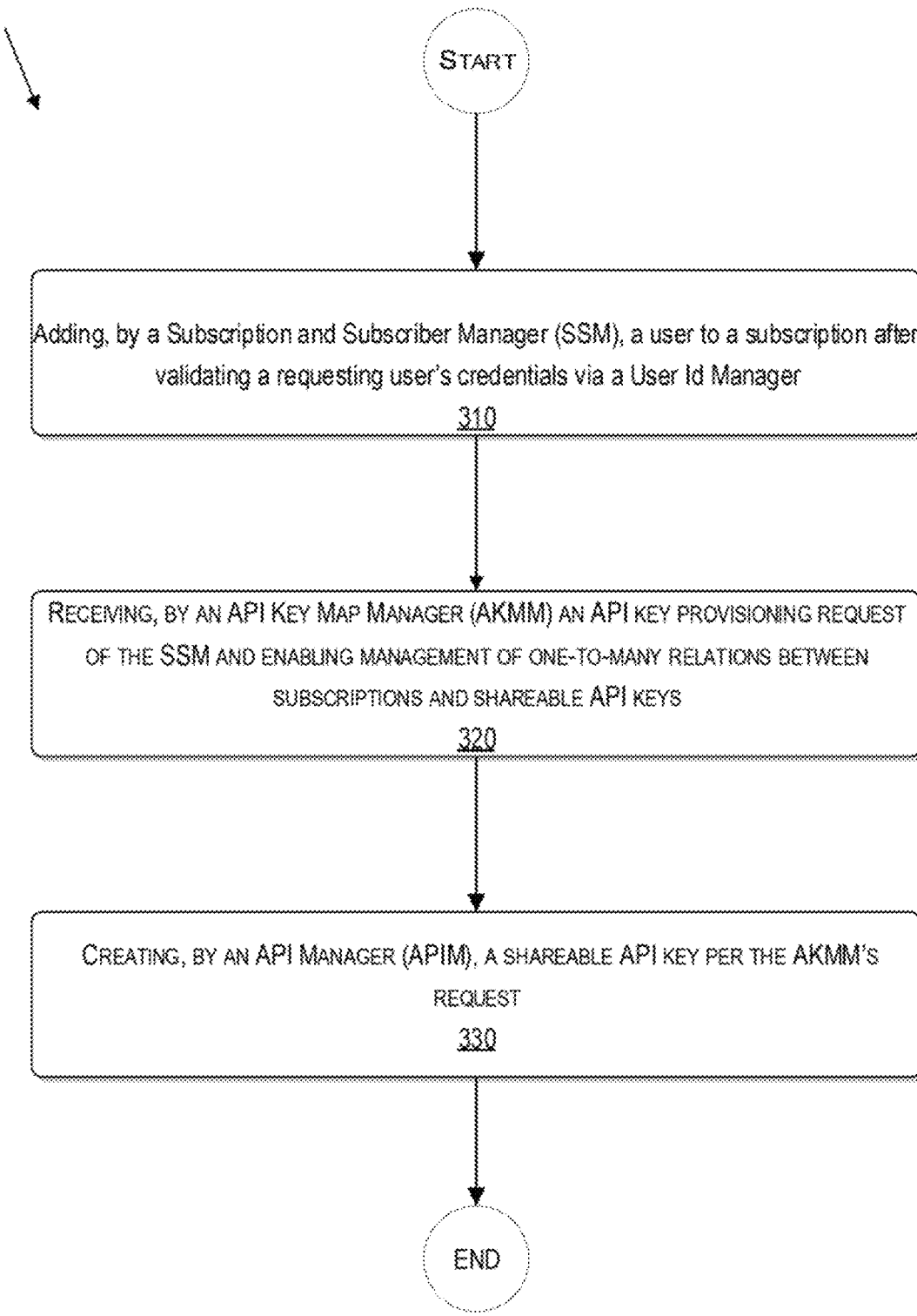
FIG. 3B is a flowchart illustrating an example of a computer-implemented method of a subscription provisioning process according to an embodiment of the present disclosure.

FIG. 3A is an overview of some components used to perform a subscription provisioning process according to an embodiment of the present disclosure, and FIG. 3B is a flowchart illustrating an example of a computer-implemented method of a subscription provisioning process according to an embodiment of the present disclosure. The subscription provisioning process includes the system configuration of settings that are associated with the configuration and maintenance of subscriptions in customer master data. The process of creating a new shareable API key, changing the credential of an existing shareable API key, or deleting an existing shareable API key in the system is similar to the API key management aspect of the subscription provisioning process.

Referring to FIG. 3A, the Subscription and Subscriber Manager (SSM) 135 maintains two types of relations among subscriptions, users, and API keys (e.g., pairs of API "client id" and "client secret", which can be used as credential of the associated client id). One of the relation types regards many-to-many relations between subscriptions and users (as subscribers), i.e., one subscription can be subscribed by many users, and one user can be a subscriber of many subscriptions. The other relation type regards one-to-many relations between subscriptions and API keys, i.e., one subscription can own many API keys, and every API key can be assigned to only one subscription. Operational data on the sharing of a specific API key among several subscribers of the same subscription is managed by SSM. No other components need to maintain this kind of operational data. For example, the API Manager (APIM) 110 in practice usually manages the lifecycle and usage of API keys with no notion of subscription-based API key sharing among several users.

The API Key Map Manager (AKMM) 125 bridges the gap between SSM's needs for managing shareable API keys and APIM's API key management capabilities which need not have built-in support for shareable API keys. When an API key needs to be created, regenerated, or deleted for a subscription, the SSM invokes AKMM to perform the required API key management task with no need to know the APIM in use. AKMM hides the implementation details of APIM from SSM and invokes APIM in the context of the target subscription such that one-to-many relations between subscriptions and API keys can be maintained in SSM. Neither APIM nor AKMM need to know the relations between subscriptions and users.

With continued reference to FIG. 3A, the Subscription and Subscriber Manager (SSM) 135, requests a User ID Manager UIM 120 to validate a user's credentials. The SSM 135 is configured to add a user to a subscription after a user credentials validation is performed by the UIM 120. The API Key Map Manager (AKMM) 125 is configured to enable management of the one-to-many relations between subscriptions and the shareable API key in response to receiving an API key provisioning request from the SSM 135 when provisioning a new API key is necessary. The API Manager (APIM) 110 can create an API key in response to the AKMM's 125 request. Although the APIM may not have built-in support for shareable API keys, the new API key is shareable among SSM subscribers of the target subscription.

With further regard to the management by the AKMM 125 of one-to-many relations between subscriptions and the API keys, an artisan should appreciate that the relationship between subscriptions and the API keys may exist at least according to one of the following types:

1. One subscription, one subscriber, one API key (note: no sharing of API keys), which is the simplest use case. For example, one-to-one may be used in subscription-based dataset and API operations authorization. The capabilities include offering registration, and API key access.
2. One subscription, many subscribers, one API key (note: subscription-based sharing of one API key). For example, one API key is used as a group key. The capabilities include those of relationship (1) above and invitee lifecycle management.
3. One subscription, one subscriber, many API keys (note: no sharing of API keys). For example, one subscriber with many applications, each needs its own identity. The capabilities include those of relationship (1) and API key lifecycle management.
4. One subscription, many subscribers, many API keys (note: subscription-based sharing of API keys). For example, shared management of group keys among subscribers. The capabilities are all of relationships (1)+(2)+(3) above.

5. Many subscriptions, each has one subscriber (note: no sharing of API keys). For example, one Internet-of-Things (IoT) application with many IoT devices deployed at many remote locations under the model in which every device is configured with a functional ID and one subscription is provisioned for every remote location. The capabilities include those of relationship (1) above and multiple subscriber-id-specific offering registrations.
6. Many subscriptions, each has one or more subscribers (note: subscription-based sharing of API keys). For example, project-based management of subscribers and API keys under the model in which one subscription is provisioned for every project. The capabilities include those of relationship (5) above and invitee lifecycle management.

FIG. 3B is a flowchart providing an example of a subscription provisioning process according to an embodiment of the present disclosure.

At operation 310, the SSM 135 adds a user to subscription after the UIM 120 completes a successful validation of the user's credentials. In this embodiment, the SSM 135 requests that the UIM 120 perform the validation of the user's credentials.

At operation 320, the SSM 135 sends an API key provisioning request to the API Key Manager (AKMM) 125. The API Key Map Manager (AKMM) 125 is configured to enable management of the one-to-many relations between subscriptions and the shareable API keys.

At operation 330, the APIM 110 creates a shareable API key per the AKMM's 125 request.

Figure 4:
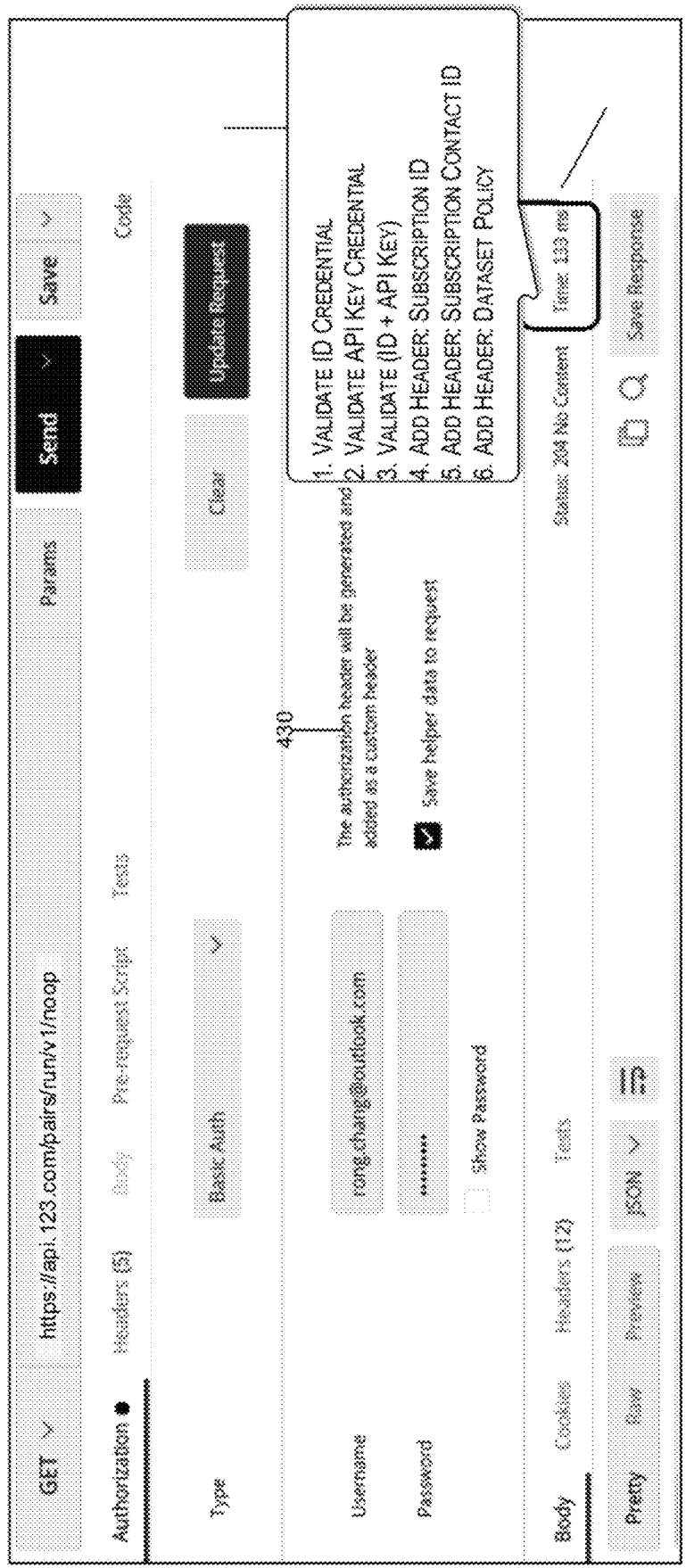
FIG. 4 is an illustration of a partially optimized implementation showing Enterprise to Enterprise (E2E) according to an embodiment of the present disclosure.

For example, in the screenshot shown in FIG. 4, item 410 shows the tasks that are performed in the IPS REST API "Get/noop" in a sample Enterprise to Enterprise (E2E) environment. It will be understood that the E2E is provided for illustrative purposes, and the claimed subject matter is not limited to such. In this example, an authorization header is created and added as a customer header as disclosed by item 430. As can be seen in FIG. 4, some of the tasks include Validate an ID credential, Validate an API key credential, Validate the (ID and API KEY), and add to the header: a Subscription ID, a Subscription Contact ID, and the Dataset policy information. According to the screenshot in FIG. 4, the response time 420 is 133 ms for the operation. Thus, there is an integration of authentication using a shareable API key as discussed herein above with a negligible impact on response time to create an authorization header.

Example Computer Platform

Figure 5:
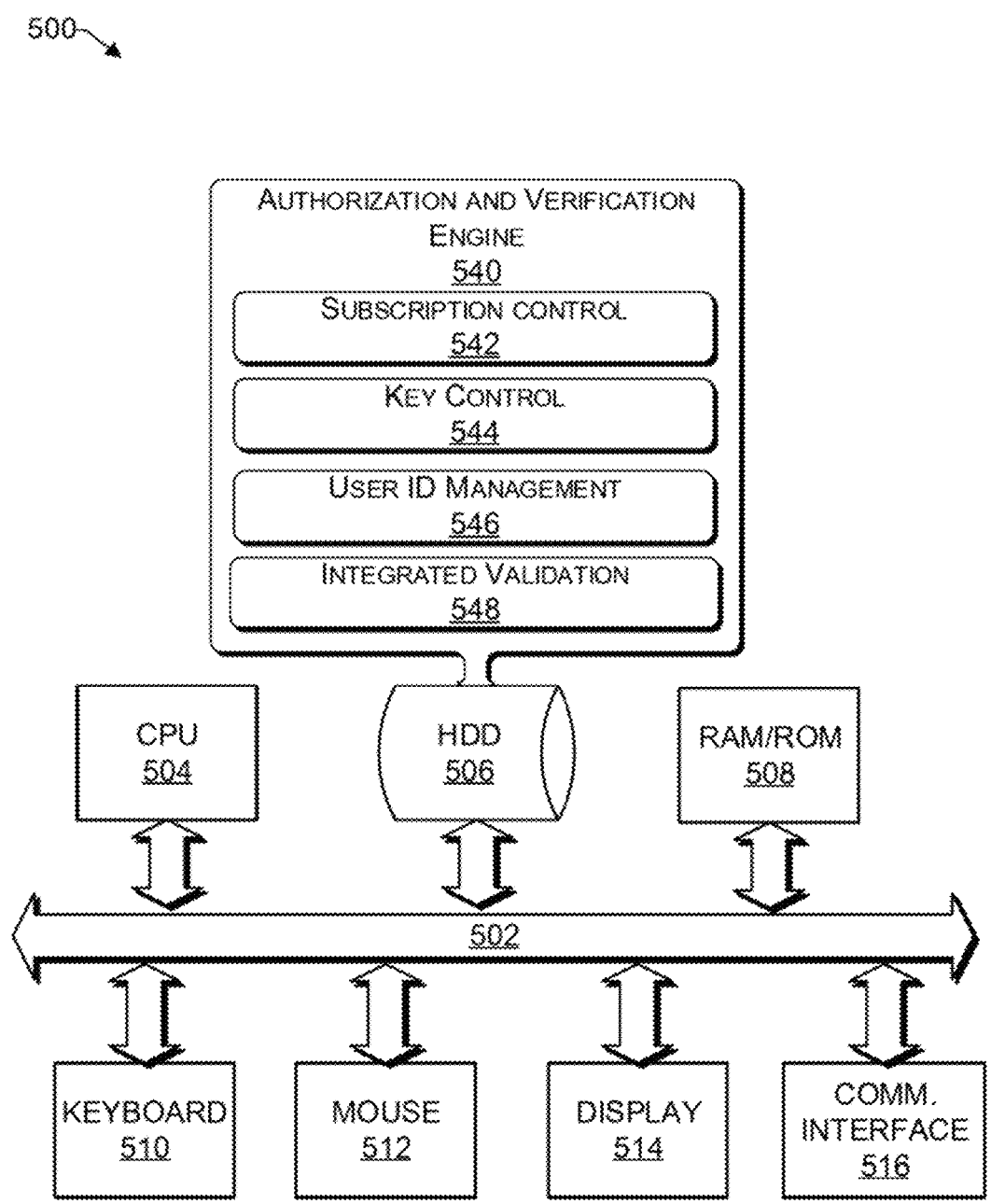
FIG. 5 provides a functional block diagram illustration of a computer hardware platform for the computer-implemented methods and systems according to the present disclosure.

As discussed above, functions relating to managing authorization and verification for API service invocations can be performed with the use of one or more computing devices connected for data communication via wireless or wired communication, as shown in FIG. 1 and in accordance with the processes of FIGS. 2B and 3B, respectively. FIG. 5 provides a functional block diagram illustration of a computer hardware platform that is capable of communicating with a regulation repository, identifying relevant authorization and verification considerations for an API service invocation, and identifying appropriate executable code. In particular, FIG. 5 illustrates a network or host computer platform 500, as may be used to implement an appropriately configured server, including some of the API components shown in FIG. 1.

The host computer platform 500 may include a central processing unit (CPU) 504, a hard disk drive (HDD) 506, random access memory (RAM) and/or read-only memory (ROM) 508, a keyboard 510, a mouse 512, a display 514, and a communication interface 516, which are connected to a system bus 502.

In one embodiment, the HDD 506 has capabilities that include storing a program that can execute various processes, such as the authorization and verification engine in a manner described herein. The authorization and verification engine 540 may have various modules configured to perform different functions. While one example of an authorization and verification engine is discussed herein below, the inventive concept is not limited to the example provided for illustrative purposes.

For example, in one embodiment, there may be a subscription control module 542 that is operative to receive electronic data from various sources (including the cloud) that provide subscriptions for one or more services that are authenticated by the authorization and verification engine 540. The subscription control module 542 may receive updated lists of subscribers each time a change occurs (dynamically) and/or at predetermined intervals. The subscription control module may also manage the respective subscribers and associated shareable API keys.

In addition, a key control module 544 is operative to manage a lifecycle of API key IDs to support API key validation, as API key IDs may change or expire. The key control module 544 may request subscription ID information and validated subscriber ID information from the subscription control module 542 that is provided to back end service implementers.

A user ID management module 546 is operative to manage user IDs and credentials such as passwords, private keys, etc. and may provide user authentication services for the subscribers.

An integrated validation module 548 is operative to perform subscription based integrated validation of subscriber and API key credentials (e.g. API secret key, API access token, etc.). The integration of information may be received from the subscription control module 542, the key control module 544 and user ID management module 546.

In one embodiment, a program, such as Apache™, can be stored for operating the system as a Web server. In one embodiment, the HDD 506 can store an executing application that includes one or more library software modules, such as those for the Java™ Runtime Environment program for realizing a JVM (Java™ virtual machine).

Example Cloud Platform

Figure 6:
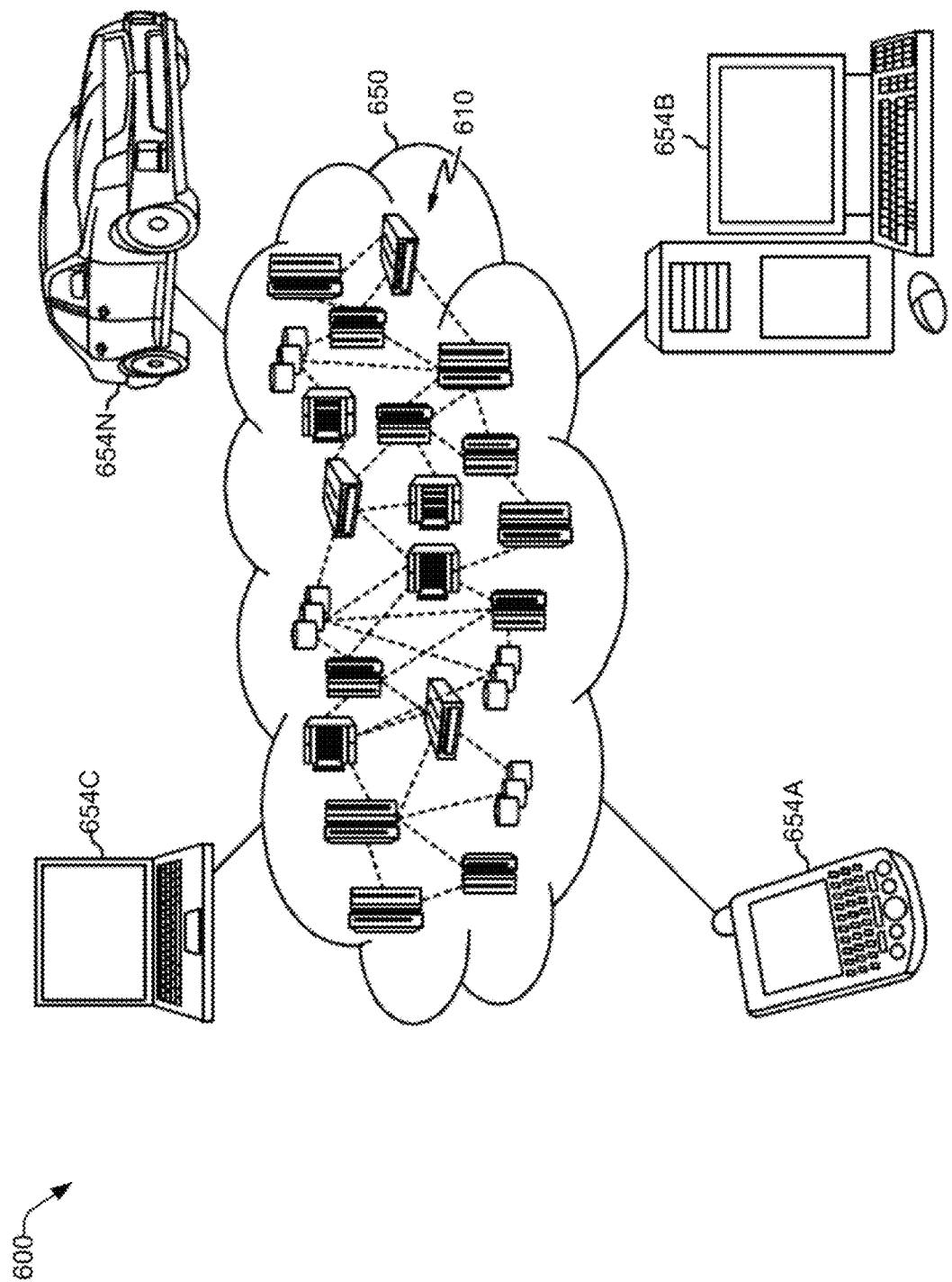
FIG. 6 is an illustrative example of a cloud computing environment.

As discussed above, functions relating to managing the authorization and verification of API service invocations may include a cloud computing environment 650 (see FIG. 6). It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Cloud Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, authorization, verification and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 6, an illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, orHybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
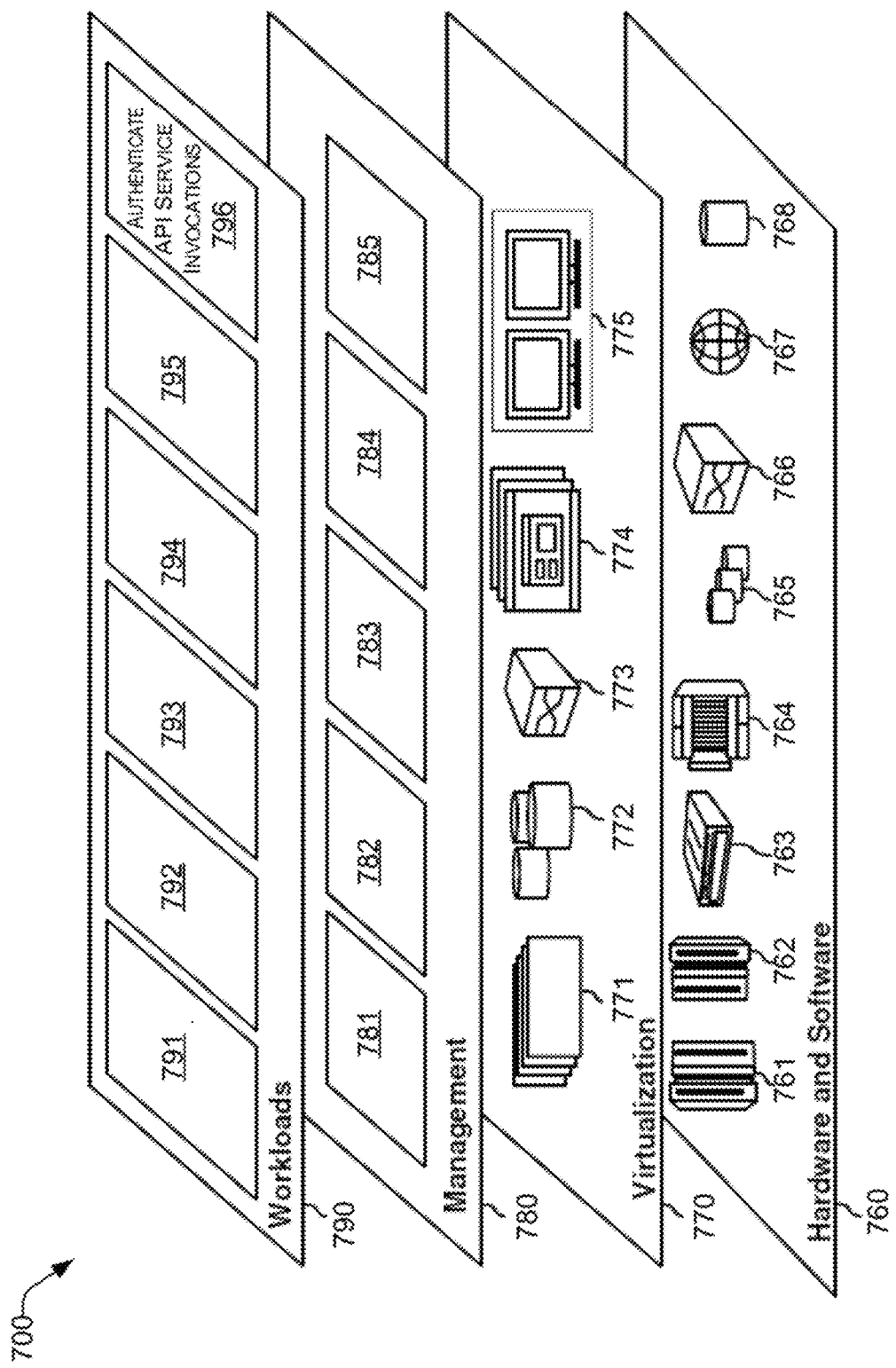
FIG. 7 depicts a set of functional abstraction layers provided by a cloud computing environment shown in FIG. 6.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer includes: mapping and navigation 791; software development and lifecycle management 792; virtual classroom education delivery 793; data analytics processing 794; transaction processing 795; and authenticating API Service Invocations 796, as discussed herein.

Computer Program Product

In an embodiment of the present disclosure, by virtue of the concepts discussed herein, in various aspects, the computer-implemented system and method provides at least an improvement in computer security and operations in which a shareable API key is used multi-tenant service. For the computer-implemented system and method provides an improvement in computer security and computer operations by integrating the authentication of API service invocations with the API service subscription management process and an API key lifecycle management process. Whereas the separate authentication of a key by itself and a token by itself has an integrity exposure in that a user may leave a group but still have unauthorized access to content, in the computer-implemented system and method of the present disclosure, the API Policy Manager (APM) integrates the operations of authentication of the API service invocations with the API service subscription management process and an API key lifecycle management process to perform integrity checking.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The present application may be a system, a method, and/or a computer program product. The computer program product may include a computer-readable storage medium (or media) having computer readable program instructions thereon for causing a processor to carry out aspects of the present application.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present application may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present application.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for authenticating Application Programming Interface (API) service invocations in which a non-transitory computer readable storage medium tangibly embodying a computer readable program code having computer readable instructions that, when executed, causes a computer device to execute a method of validating a user and the use of a shareable API key to invoke an API operation, the computer-implemented method comprising:
   receiving an API invocation request associated with a user, an API operation, and the shareable API key;
   validating API key credentials of the shareable API key associated with the API invocation request;
   validating user credentials of the user associated with the API invocation request;
   determining whether the user having validated user credentials is authorized to use the shareable API key to invoke the API operation by integrating in an authorization header an authentication of the API invocation request with an API service subscription management and an API key lifecycle management process to perform an integrity check of the user's access to content; and
   executing the API operation in response to determining the user having validated user credentials is authorized to use the shareable API key to invoke the API operation.

2. The computer-implemented method according to claim 1, wherein the determining whether the user having validated user credentials is authorized to use the shareable API key includes determining whether the user is an authorized subscriber of a subscription service.

3. The computer-implemented method according to claim 1, further comprising providing a notification to a sender of the API invocation request that the user is not authorized to use the shareable API key to invoke the API operation.

4. The computer-implemented method according to claim 1, wherein the API operation comprises a multi-tenant service application.

5. The computer-implemented method according to claim 1:
wherein the validating of the API key credentials includes validating an API key ID and an API secret key by an API Manager (APIM) that receives the API invocation request from an API client, and
wherein the validating user credentials is performed by a User ID Manager (UIM) in response to a request from the APIM.

6. The computer-implemented method according to claim 5, wherein the request from the APIM to validate user credentials is sent by a protocol from at least one of: (i) a Lightweight Directory Access Protocol (LDAP), (ii) an Open Authorization (OAuth), or (iii) an Active Directory.

7. The computer-implemented method according to claim 5, wherein the determining whether the user having validated user credentials is authorized to use the shareable API key to invoke the API operation includes receiving, by an API Policy Manager (APM), the API key ID and API secret key validated by the APIM, and a user ID of the user, and validating by a Subscription and Subscriber Manager (SSM) that the user is a subscriber of a subscription that owns the shareable API key.

8. The computer-implemented method according to claim 7, wherein executing the API operation is performed by a Service Implementer (SI) in response to the APM validating that the user is a subscriber of a subscription that owns the shareable API key.

9. The computer-implemented method of claim 7, wherein the computer readable program code having computer readable instructions is provided as a service in a cloud environment.

10. A computer-implemented method in which a computer readable storage medium tangibly embodying a computer readable program code having computer readable instructions that, when executed, causes a computer device to execute a subscription provisioning process, the computer-implemented method comprising:
adding, by a Subscription and Subscriber Manager (SSM), a user to a subscription after validating a requesting user's credentials via a User ID Manager, and
adding to a target subscription by the SSM in response to receiving an Application Program Interface (API) key provisioning request, a new API key received from an API Key Map Manager (AKMM) after the AKMM receives the new API key provisioned by an API Manager (APIM) in the context of the target subscription based on the SSM's request to enable managing one-to-many relations between subscriptions and a plurality of shareable API keys, and
performing an integrity check by integrating in an authorization header an authentication using at least one of the plurality of shareable API keys and an API key lifecycle management process.

11. A system for authenticating Application Program Interface (API) Service Invocations, comprising:
an API Manager (APIM) configured to receive an API invocation request associated with a user, an API operation and a shareable API key, and to validate API key credentials of the shareable API key associated with the API invocation request;
a User ID Manager (UIM) configured to validate user credentials of the user associated with the API invocation request;
an API Policy Manager (APM) configured to determine whether the user having validated user credentials is authorized to use the shareable API key to invoke the API operation, and to perform integrity checking by integrating in an authorization header an authentication of the API service invocation request with an API service subscription management and an API key lifecycle management process; and
a Service Implementer (SI) configured to execute the API operation in response to determining the user having validated user credentials is authorized to use the shareable API key to invoke the API operation.

12. The system according to claim 11, wherein the APM determines whether the user having the validated user credentials is authorized to use the shareable API key by requesting a Subscription and Subscriber Manager (SSM) to validate that the user is a subscriber of a subscription that owns the shareable API key.

13. The system according to claim 12, further configured to execute a subscription provisioning operation by configuring the SSM to:
add a user to a subscription after validating a requesting user's credentials via the UIM; and
send an API key provisioning request of the SSM to an API Key Map Manager (AKMM) to enable management of one-to-many relations between subscriptions and API keys.

14. The system according to claim 13, wherein the APIM is configured to create an API key per the AKMM's request.

15. The system according to claim 11, wherein the APIM is configured to validate the API key credentials by validating an API key ID and an API secret key.

16. The system according to claim 11, wherein the APIM is further configured to provide a notification to a sender of the API invocation request that the user is not authorized to use the shareable API key to invoke the API operation.

17. The system according to claim 11, further comprising an API Key Map Manager (AKMM) configured to enable subscription-based sharing of API keys among multiple users.

18. The system according to claim 11, wherein the API operation comprises a multi-tenant service application.

19. The system according to claim 11, wherein the APIM is further configured to send the UIM a request to validate user credentials by a protocol from at least one of:
(i) a Lightweight Directory Access Protocol (LDAP), (ii) an Open Authorization (OAuth), and (iii) an Active Directory.

20. The system according to claim 11, wherein a Subscription and Subscriber Manager (SSM) is configured to determine whether the user is a subscriber of a subscription that owns the shareable API key.

* * * * *